Patented Dec. 22, 1953

2,663,692

UNITED STATES PATENT OFFICE 2,663,692

MIXED INDICATOR COMPOSITION

Joseph V. Corso, Brooklyn, and Richard C. Ulmer, Bronxville, N. Y., assignors to E. F. Drew & Co., Inc., New York, N. Y., a corporation of Delaware No Drawing. Application September 2, 1949, Serial No. 113,898

5 Claims. (Cl. 252—408)

The present invention is directed to compositions adapted to indicate a change of pH, and more particularly to an indicator adapted for determining the alkalinity of various solutions.

For a considerable number of years methyl orange has been used as an indicator in titrating alkaline solutions wherein the original yellow color of the indicator changes to red in passing from alkaline to acid condition. The color transition took place over a relatively wide range of pH, say, from 3.7 to 4.2. The change was gradual and not sufficiently accurate for many purposes as the end point was not sharply defined. In certain cases where the alkalinity of such water as is used for boiler feed and contains some color, the end point was further masked and the inaccuracy accentuated.

In order to overcome these defects, various changes in the indicator itself have been suggested but none of them have satisfactorily overcome the deficiencies. One such proposal was to provide a mixture of methyl orange in the form of its sodium salt with alphazurine A in water solution. The added blue dye made the end point somewhat more easily detectable but it changed the end point to a different pH which may be undesirable in titrating of alkalinity of boiler feed waters. Furthermore, the change at the end point is over a considerable range as the color changes from green to green-gray to purple-gray to purple during the transition, and such transition is not sufficiently sharp, particularly as the green-gray is usually taken as the end point.

The present invention is intended and adapted to overcome the difficulties and disadvantages inherent in prior indicator compositions for the purpose described, it being among the objects of the present invention to provide an indicator composition which is capable of giving an end point which is sharp and accurate and wherein the transition is over a very short range of pH.

It is also among the objects of the present invention to provide an indicator composition which is particularly suitable for use in titrating alkaline boiler feed waters for the purpose of determining the amount and character of addition agents for treatment of said water.

It is further among the objects of the present invention to provide an indicator composition in solution in water which is stable over long periods of time and which is not adversely affected by impurities in the water being tested.

Essentially the invention is based upon the provision of a mixture of dyes or indicators and specifically there are provided three such dyes. The principal compound is ethyl orange, which constitutes the major constituent. The amount thereof is at least equal to the sum of the amounts of the other dyes present. There are further provided blue and red dyes in suitable relative proportions which are incorporated to provide the mixture. Because of this composition, the end point can be readily and accurately noted in the titration and prior to reaching the end point a clear warning is given by a definite change in the original color of the indicator mixture. The change at the end point is sharply within a very narrow range of pH. The sharpness and accuracy is present even though the water may be relatively highly colored.

More specifically there is added to the ethyl orange a mixture of alphazurine A and fuchsin red, the amount of fuchsin red being about one-third of the amount of alphazurine A. Such compositions operate within the range of pH between 3.8 and 4.0.

To provide the desired composition, there is dissolved in 1000 cc. of water the mixture of constituents in the following proportions:

| | Grams |
|---|---|
| Ethyl orange | 2.0 to 2.5 |
| Alphazurine A | 1.4 to 1.6 |
| Fuchsin red | 0.4 to 0.6 |

The amount of indicator varies from 3.8 to 4.7 grams per liter. Only a few drops of the indicator solution is necessary in conducting the ordinary titration.

A specific composition within the above range which has been found highly satisfactory for testing the alkalinity of practically all boiler feed waters is as follows:

| | Grams per liter |
|---|---|
| Ethyl orange | 2.33 |
| Alphazurine A | 1.50 |
| Fuchsin red | 0.50 |

When this indicator is added to an alkaline solution it provides a readily distinguishable, clear, green color. As titration proceeds, the green changes to a gray at a pH of 4.2 to 4.3. This constitutes a warning to the chemist that he is approaching the end point and therefore he pays close attention to the changes. Then at a pH of 3.9 to 3.8 the gray changes to a bright purple by the addition of a single drop of a standard acid solution normally used for the purpose. In this way, a very accurate titration is obtained.

The ethyl orange used in the composition is the 4-diethylamino azobenzene sulfonic acid. The alphazurine A is the calcium salt of the disulfonic acid of m'-hydroxy-dibenzyldiethyldiamino-triphenyl-carbinol. The fuchsin red is a mixture of pararosaniline (triamino triphenyl carbinol) and rosaniline (triamino-diphenyltolyl-carbinol)-hydrochlorides.

Although the invention has been described setting forth a single specific composition, the invention is not limited thereto as slight changes in the proportions of the several dyes named herein within the limits set forth may be made with good results. By such changes desirable variations in the end point within the specified range may be obtained. The presence of small amounts of inert constituents other than dyes, does not adversely affect the indicator. Dyes which are the equivalent of those specifically named may be used in part or in whole for the same. The fuchsin red is a mixture of two substances on which the proportions may vary, but generally it is convenient and prferable to use color index No. 677, which is a standard in the dye industry. It is not essential that the hydrochlorides of the rosaniline dyes be used, but other salts, for instance, acetates, are equally suitable. The indicator of the present invention is applicable wherever methyl orange is used and in other titrations than boiler feed waters. By the expression "boiler feed waters" there is included boiler and similar waters as well as the feed waters for boilers and the like.

These and other changes in the details of the invention may be made within the spirit thereof and the invention is to be broadly construed and not to be limited except by the character of the claims appended hereto.

We claim:

1. A composition for indicating color changes in titration consisting essentially of a mixture of ethyl orange, alphazurine A and fuchsin red, the ratio of alphazurine to fuchsin being about 3 to 1, dissolved in water in the amount of 3.8 to 4.7 grams per liter the ethyl orange being in an amount about equal to the sum of the amounts of the other dyes present, the color thereof being green and changing to gray-purple in the range of pH 4.3 to 3.8.

2. A composition for indicating color changes in titration consisting essentially of a mixture of ethyl orange, alphazurine A and fuchsin red, the ratio of alphazurine to fuchsin being about 3 to 1, dissolved in water, the ethyl orange being in an amount about equal to the sum of the amounts of the other dyes present, the color thereof being green and changing to gray-purple in the range of pH 4.3 to 3.8.

3. A composition for indicating color changes in titration consisting essentially of a mixture of ethyl orange, alphazurine A and fuchsin red, dissolved in water in the amount of 3.8 to 4.7 grams per liter, the colors being in the following proportions:

| | Grams |
|---|---|
| Ethyl orange | 2.0 to 2.5 |
| Alphazurine A | 1.4 to 1.6 |
| Fuchsin red | 0.4 to 0.6 |

4. A composition for indicating color changes in titration consisting essentially of a mixture of ethyl orange, alphazurine A and fuchsin red, dissolved in water in the amount of 3.8 to 4.7 grams per liter, the colors being in the following proportions:

| | Grams |
|---|---|
| Ethyl orange | 2.33 |
| Alphazurine A | 1.50 |
| Fuchsin red | 0.50 |

5. A composition for indicating color changes in titration consisting essentially of a mixture of ethyl orange, alphazurine A and fuchsin red, the ratio of alphazurine to fuchsin being about 3 to 1, dissolved in water in the amount of 3.8 to 4.7 grams per liter, and having an end point at a pH of 3.8 to 4.3 with a purple color.

JOSEPH V. CORSO.
RICHARD C. ULMER.

References Cited in the file of this patent

Prideaux J.: Soc. Chem. Ind., vol. 45, pp. 664, 678, 697 (1926).

Kolthoff et al.: "Acid-Base Indicators"; The Macmillan Co., New York, 1937, pp. 172–177.

Britton: Hydrogen Ions, vol. I, 3rd ed., D. Van Nostrand Co., Inc., New York, N. Y. (1943), pp. 328, 358.

Whitehead et al.: "Oxidation, Reduction Indicators Used in, Volumetric Analysis, Article Based on Thesis submitted by Claude C. Wills to the Faculty of the Univ. of Georgia, Athens, Ga. Received April 5, 1941, in Chemical Reviews, vol. 29, pp. 69–121.